US009456238B2

(12) United States Patent
Toyama et al.

(10) Patent No.: US 9,456,238 B2
(45) Date of Patent: *Sep. 27, 2016

(54) PORTABLE AUDIO/VIDEO PLAYBACK APPARATUS

(71) Applicant: KYOCERA CORPORATION, Kyoto (JP)

(72) Inventors: Tateo Toyama, Sakai (JP); Masaru Kato, Higashiosaka (JP)

(73) Assignee: Kyocera Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/577,533

(22) Filed: Dec. 19, 2014

(65) Prior Publication Data

US 2015/0103256 A1 Apr. 16, 2015

Related U.S. Application Data

(63) Continuation of application No. 13/430,540, filed on Mar. 26, 2012, now Pat. No. 8,918,140, which is a continuation of application No. 10/549,304, filed as application No. PCT/JP2004/002236 on Feb. 25, 2004, now Pat. No. 8,145,266.

(30) Foreign Application Priority Data

Mar. 17, 2003 (JP) ................................. 2003-071835

(51) Int. Cl.
*H04N 21/41* (2011.01)
*H04N 5/44* (2011.01)
(Continued)

(52) U.S. Cl.
CPC ............ *H04N 21/4126* (2013.01); *H04N 5/44* (2013.01); *H04N 21/4183* (2013.01);
(Continued)

(58) Field of Classification Search
CPC ....................... H04N 21/6125; H04M 1/72527
USPC .......................................................... 348/503
See application file for complete search history.

(56) References Cited

U.S. PATENT DOCUMENTS

| 5,491,507 A | 2/1996 | Umezawa et al. |
| 6,810,274 B2 | 10/2004 | Sawada et al. |
| 8,918,140 B2* | 12/2014 | Toyama .................. H04N 5/44 455/556.1 |

(Continued)

FOREIGN PATENT DOCUMENTS

| CN | 1310566 A | 8/2001 |
| EP | 1289232 A1 | 3/2003 |

(Continued)

OTHER PUBLICATIONS

Office Action dated Aug. 10, 2007, from corresponding Chinese Patent Application No. 2004800072131.

*Primary Examiner* — Kwasi Karikari
(74) *Attorney, Agent, or Firm* — Duane Morris LLP

(57) ABSTRACT

A portable audio/video playback apparatus of the present invention comprises an apparatus main body 1 and a broadcast receiver unit 4 removably attached to the apparatus main body. The apparatus main body 1 includes interfaces 32, 33 for connecting thereto the broadcast receiver unit; an audio processing circuit 22 connected to one interface 32 for processing and feeding an external audio signal to a speaker 24; and a video processing circuit 27 connected to the other interface 33 for processing and feeding an external video signal to a display 13. The broadcast receiver unit 4 includes interfaces 55, 56 connected to the foregoing interfaces 32, 33 and decoders 47, 48 for feeding an audio signal and a video signal included in a received television broadcast signal to the interfaces 55, 56.

19 Claims, 13 Drawing Sheets

(51) Int. Cl.
*H04N 21/414* (2011.01)
*H04N 21/418* (2011.01)
*H04N 21/426* (2011.01)
*H04N 21/439* (2011.01)
*H04N 21/44* (2011.01)
*H04N 21/61* (2011.01)
*H04M 1/725* (2006.01)

(52) U.S. Cl.
CPC . *H04N 21/41407* (2013.01); *H04N 21/42607* (2013.01); *H04N 21/439* (2013.01); *H04N 21/44* (2013.01); *H04N 21/6112* (2013.01); *H04N 21/6125* (2013.01); *H04M 1/72527* (2013.01)

(56) References Cited

U.S. PATENT DOCUMENTS

| | | |
|---|---|---|
| 2002/0016188 A1 | 2/2002 | Kashiwamura |
| 2002/0129367 A1 | 9/2002 | Devara |
| 2003/0013483 A1 | 1/2003 | Ausems et al. |
| 2003/0130009 A1* | 7/2003 | Kung .................. H04B 1/207 455/557 |
| 2003/0181226 A1 | 9/2003 | Kawata et al. |

FOREIGN PATENT DOCUMENTS

| | | |
|---|---|---|
| JP | 11-40960 A | 2/1999 |
| JP | 11-122128 A | 4/1999 |
| JP | 2002-101059 A | 4/2002 |
| JP | 2002-271860 A | 9/2002 |

\* cited by examiner

PORTABLE AUDIO/VIDEO PLAYBACK APPARATUS

CROSS-REFERENCE TO RELATED APPLICATIONS

This application is a continuation of U.S. patent application Ser. No. 13/430,540, filed on Mar. 26, 2012, now allowed, which is a continuation of U.S. patent application Ser. No. 10/549,304, filed Feb. 25, 2004, now U.S. Pat. No. 8,145,266, which is a U.S. National Phase application of International Application No. PCT/JP2004/002236, filed Feb. 25, 2004, which claims priority to Japanese Application No. 2003-071835, filed Mar. 17, 2003. The disclosures of these applications are incorporated herein by reference in their entireties.

TECHNICAL FIELD

The present invention relates to a portable audio/video playback apparatus such as a portable telephone having a broadcast receiving function.

BACKGROUND ART

FIG. 14 shows a configuration of a conventional portable telephone. The portable telephone includes, as shown, a telephone main body part 9 that demonstrates a function as a portable telephone, and a power source part 90 that serves as a power source of the telephone main body part 9.

A signal received by an antenna 91 is fed to a baseband circuit 93 through an RF circuit 92 and demodulated to a digital reception signal. The digital reception signal is fed to an audio processing circuit 95 and subjected to a predetermined signal processing. An analog reception signal thereby obtained is fed to a speaker 98 and radiated as sound. On the other hand, a transmission signal inputted into a microphone 97 is fed to the audio processing circuit 95 and subjected to a predetermined signal processing. A digital transmission signal thereby obtained is fed to the baseband circuit 93 and modulated. The digital transmission signal modulated is transmitted from the antenna 91 through the RF circuit 92.

Moreover, in addition to a telephone communication function, the above-described portable telephone has a function of downloading various images from a site on the Internet. A digital video signal demodulated in the baseband circuit 93 is fed to a video processing circuit 101 and subjected to a predetermined signal processing. An analog video signal thereby obtained is fed to a display 102. Consequently, the images downloaded from the site on the Internet can be displayed on the display 102.

A CPU 94 is connected through a bus 103 to the above-described baseband circuit 93, audio processing circuit 95 and video processing circuit 101. Connected to the CPU 94 is a key input device 96 including a plurality of manipulation keys. Moreover, connected to the bus 103 are a ROM 100 for storing a program for performing an operation as a portable telephone, and a RAM 99 for storing various pieces of information such as telephone numbers.

On the other hand, the power source part 90 includes a secondary battery 900. Power obtained from the secondary battery 900 is supplied to the above-described circuits included in the telephone main body part 9, so that these circuits perform the above-described predetermined operations.

FIG. 15 shows a configuration of a conventional portable digital broadcast receiver having a recording function. The portable digital broadcast receiver includes, as shown, a receiver main body part 110 that demonstrates a function as a digital broadcast receiver and a power source part 130 that serves as a power source of the receiver main body part 110.

A television broadcast wave received by an antenna 111 is tuned by a tuner 112. A broadcast signal thereby obtained is fed to a CPU 113 and separated into video data and audio data. An audio decoder 114, an audio processing circuit 115, a video decoder 116 and a video processing circuit 117 are connected to the CPU 113 through a bus 123. The video data separated in the CPU 113 is, after fed to the video decoder 116 and decoded, fed to the video processing circuit 117 and subjected to a predetermined signal processing. An analog video signal thereby obtained is fed to a display 119. Consequently, video of a television broadcast program can be projected on the display 119. On the other hand, the audio data separated in the CPU 113 is, after fed to the audio decoder 114 and decoded, fed to the audio processing circuit 115 and subjected to a predetermined signal processing. An analog audio signal thereby obtained is fed to a speaker 118. Consequently, audio of a television broadcast program can be outputted from the speaker 118.

Moreover, connected to the bus 123 are a recording memory 120 for storing the video data and the audio data obtained from the CPU 113 as described above, a ROM 121 for storing a program for performing an operation as a broadcast receiver, and a RAM 122 for storing various pieces of information such as timer recording information.

On the other hand, the power source part 130 includes a secondary battery 131. Power obtained from the secondary battery 131 is supplied to the above-described circuits included in the receiver main body part 110, so that these circuits perform the above-described predetermined operations.

It is possible to add a reception function for digital broadcast to a portable telephone. Such a portable telephone may be configured, for example, by adding the receiver main body part 110 of the digital broadcast receiver shown in FIG. 15 to the portable telephone shown in FIG. 14. However, because the receiver main body part 110 includes many circuits, there is a problem that the portable telephone as a whole becomes large-sized and a weight of the portable telephone as a whole greatly increases. Moreover, there is another problem that power consumption greatly increases because power is supplied to many circuits included in the receiver main body part 110.

An object of the present invention is to provide a portable audio/video playback apparatus with a broadcast receiving function that is as a whole small-sized, light-weighted, and also low power-consuming.

SUMMARY OF THE INVENTION

A portable audio/video playback apparatus of the present invention has a broadcast receiving function, and includes an apparatus main body with a speaker and a display capable of reproducing and outputting an audio signal and a video signal, and a broadcast receiver unit removably attached to the apparatus main body. In one embodiment, the apparatus main body includes: interface means for connecting thereto the broadcast receiver unit; audio signal processing means connected to the interface means for applying a signal processing to an audio signal externally fed thereto to prepare a signal to be outputted to the speaker, and feeding the signal to the speaker; and video signal processing means connected to the interface means for applying a signal processing to a video signal externally fed thereto to prepare a signal to be outputted to the display, and feeding the signal to the display. On the other hand, the broadcast receiver unit comprises: interface means connected to the interface means of the apparatus main body; and signal feeding means for feeding an audio signal and a video signal included in a received television broadcast signal to the interface means.

The above-described portable audio/video playback apparatus with a broadcast receiving function of the present invention includes an apparatus main body and a broadcast receiver unit removably attached to the apparatus main body. A user removes the broadcast receiver unit from the apparatus main body when the portable audio/video playback apparatus is used as an audio/video playback apparatus.

In the apparatus main body, an audio signal and a video signal downloaded from, for example, on the Internet, or an audio signal and a video signal stored in a built-in memory, are fed to the audio signal processing means and the video signal processing means, respectively. The audio signal processing means applies a signal processing to the audio signal fed thereto to prepare a signal to be fed to the speaker, and feeds the signal to the speaker. On the other hand, the video signal processing means applies a signal processing to the video signal fed thereto to prepare a signal to be fed to the display, and feeds the signal to the display. Thus, a playback output function for an audio signal and a video signal is demonstrated.

In contrast, when the above-described portable audio/video playback apparatus is used as a broadcast receiver apparatus, a user attaches the broadcast receiver unit to the apparatus main body. The interface means of the apparatus main body and the interface means of the broadcast receiver unit can be thereby connected to each other.

In this state, an audio signal and a video signal included in a received television broadcast signal are fed to the interface means by the signal feeding means of the broadcast receiver unit. The audio signal and the video signal fed to the interface means are fed to the audio signal processing means and the video signal processing means, respectively, through the interface means of the apparatus main body. The audio signal processing means applies a signal processing to the audio signal fed thereto to prepare a signal to be fed to the speaker, and feeds the signal to the speaker. On the other hand, the video signal processing means applies a signal processing to the video signal fed thereto to prepare a signal to be fed to the display, and feeds the signal to the display. Consequently, audio of a television broadcast program can be outputted from the speaker, and video of the program can be projected on the display. Thus, a reception function for television broadcast is demonstrated.

In the above-described portable audio/video playback apparatus, the audio signal processing means and the video signal processing means of the apparatus main body are used also as a signal processing means for the audio signal included in the television broadcast signal and as a signal processing means for the video signal included in the television broadcast signal, respectively. Therefore, the audio processing circuit and the video processing circuit provided in the conventional digital broadcast receiver may be omitted in the broadcast receiver unit. This can realize a portable audio/video playback apparatus with a broadcast receiving function that is as a whole small-sized, light-weighted, and low power-consuming.

Moreover, when used as an audio/video playback apparatus, the portable audio/video playback apparatus can become more small-sized, light-weighted and power-saving by removing the broadcast receiver unit from the apparatus main body.

Furthermore, at the end of a life of either the apparatus main body or the broadcast receiver unit, only either the apparatus main body or the broadcast receiver unit at the end of a life can be replaced, and the other broadcast receiver unit or the apparatus main body can continue to be used.

Specifically, the apparatus main body includes power source means for serving as a power source of the speaker, the display, the audio signal processing means and the video signal processing means, while the broadcast receiver unit includes power source means for serving as a power source of the signal feeding means.

A magnitude of a voltage to be applied to the speaker, the display, the audio signal processing means and the video signal processing means of the apparatus main body differs from a magnitude of a voltage to be applied to the signal feeding means of the broadcast receiver unit. Accordingly, if a power source means that outputs a voltage having a comparable magnitude with that of the voltage to be applied to the speaker, the display, the audio signal processing means and the video signal processing means is used as a power source means of the apparatus main body, and if a power source means that outputs a voltage having a comparable magnitude with that of the voltage to be applied to the signal feeding means is used as a power source means of the broadcast receiver unit, means for raising or dropping an output voltage of the power source means is unnecessary, so that the apparatus can as a whole become more small-sized, light-weighted, and power-saving.

Moreover, because the speaker, the display, the audio signal processing means and the video signal processing means of the apparatus main body are powered by the power source means of the apparatus main body, while the signal feeding means of the broadcast receiver unit is powered by the power source means of the broadcast receiver unit, a power supply line is unnecessary between the apparatus main body and the broadcast receiver unit.

More specifically, the broadcast receiver unit includes:
power source means for serving as a power source of the signal feeding means, and the speaker, the display, the audio signal processing means and the video signal processing means of the apparatus main body; and
a pair of output terminals for outputting power obtained from the power source means. On the other hand, the speaker, the display, the audio signal processing means and the video signal processing means of the apparatus main body are incorporated in a casing. The casing is provided with a pair of input terminals for inputting power and has recessed therein a containing portion capable of interchangeably containing a battery pack for serving as a power source of the speaker, the display, the audio signal processing means and the video signal processing means, and the broadcast receiver unit. The pair of input terminals of the apparatus main body and a pair of output terminals of the battery pack contact with each other with the containing portion containing the battery pack, while the pair of input terminals of the apparatus main body and the pair of output terminals of the broadcast receiver unit contact with each other with the containing portion containing the broadcast receiver unit.

When the portable audio/video playback apparatus having the above-described specific configuration is used as an audio/video playback apparatus, the battery pack is contained in the containing portion of the casing of the apparatus main body. In this state, the pair of input terminals of the apparatus main body and the pair of output terminals of the battery pack contact with each other, so that power obtained from the battery pack is supplied to the speaker, the display, the audio signal processing means and the video signal processing means of the apparatus main body. These speaker, display, audio signal processing means and video signal processing means are supplied with the power to perform the above-described operations.

On the other hand, when the portable audio/video playback apparatus is used as a broadcast receiver apparatus, the broadcast receiver unit is contained in the containing portion of the casing of the apparatus main body. In this state, the pair of input terminals of the apparatus main body and the pair of output terminals of the broadcast receiver unit contact with each other, so that power obtained from the power source means of the broadcast receiver unit is supplied to the speaker, the display, the audio signal processing means and the video signal processing means of the apparatus main body. These speaker, display, audio signal processing means and video signal processing means are supplied with the power to perform the above-described operations. Moreover, the power obtained from the power source means of the broadcast receiver unit is supplied to the signal feeding means of the broadcast receiver unit. The signal feeding means is supplied with the power to perform the above-described operation.

In the above-described specific configuration, a power supply line for supplying power from the battery pack to the speaker, the display, the audio signal processing means and the video signal processing means of the apparatus main body at the time of use as an audio/video playback apparatus, is used also as a power supply line for supplying power from the power source means of the broadcast receiver unit to the speaker, the display, the audio signal processing means and the video signal processing means of the apparatus main body at the time of use as a broadcast receiver apparatus. Therefore, it is unnecessary to independently provide the power supply line, so that wiring of the power supply line can be simplified.

Moreover, in the above-described specific configuration, because the power source means of the broadcast receiver unit is used as a power supply source at the time of use as a broadcast receiver apparatus, which needs great power, the battery pack of the apparatus main body used as a power supply source at the time of use as an audio/video playback apparatus may have a smaller capacity. This can realize a more small-sized and light-weighted apparatus main body.

Specifically, the apparatus main body has a telephone communication function, and is capable of demonstrating the telephone communication function both with the broadcast receiver unit attached thereto and with the broadcast receiver unit removed therefrom. The portable audio/video playback apparatus having the specific configuration can be used as a telephone whether with the broadcast receiver unit attached to the apparatus main body or with the broadcast receiver unit removed from the apparatus main body.

More specifically, the apparatus main body includes receiving means for receiving an audio signal and/or a visible information signal from a telephone network. The audio signal processing means applies a signal processing to the audio signal received by the receiving means for output to the speaker, while the video signal processing means applies a signal processing to the visible information signal received by the receiving means for output to the display.

In the above-described specific configuration, the receiving means of the apparatus main body receives a reception signal and an e-mail signal including electronic information. The reception signal is fed to the speaker after fed to the audio signal processing means and subjected to the signal processing. Consequently, reception audio can be outputted from the speaker. The e-mail signal is fed to the display after fed to the video signal processing means and subjected to the signal processing. Consequently, contents of a received e-mail can be displayed on the display.

Further specifically, the receiving means of the apparatus main body is used also as a receiving means for a television broadcast signal with the broadcast receiver unit attached to the apparatus main body. In the specific configuration, because the receiving means for telephone communication of the apparatus main body is used also as a receiving means for a television broadcast signal, the antenna provided in the conventional digital broadcast receiver may be omitted in the broadcast receiver unit. This can realize an apparatus that is as a whole more small-sized and power-saving.

More specifically, the apparatus main body has a photography function for a still picture and/or a motion picture, and is capable of demonstrating the photography function both with the broadcast receiver unit attached thereto and with the broadcast receiver unit removed therefrom. The portable audio/video playback apparatus having the specific configuration can be used as a camera whether with the broadcast receiver unit attached to the apparatus main body or with the broadcast receiver unit removed from the apparatus main body.

As described above, the portable audio/video playback apparatus of the present invention can realize a small-sized, light-weighted, and power-saving apparatus main body.

DETAILED DESCRIPTION OF EXEMPLARY EMBODIMENTS OF THE INVENTION

The present invention carried out on a portable telephone will be specifically described below in accordance with two exemplary embodiments.

First Embodiment

Figure 1:
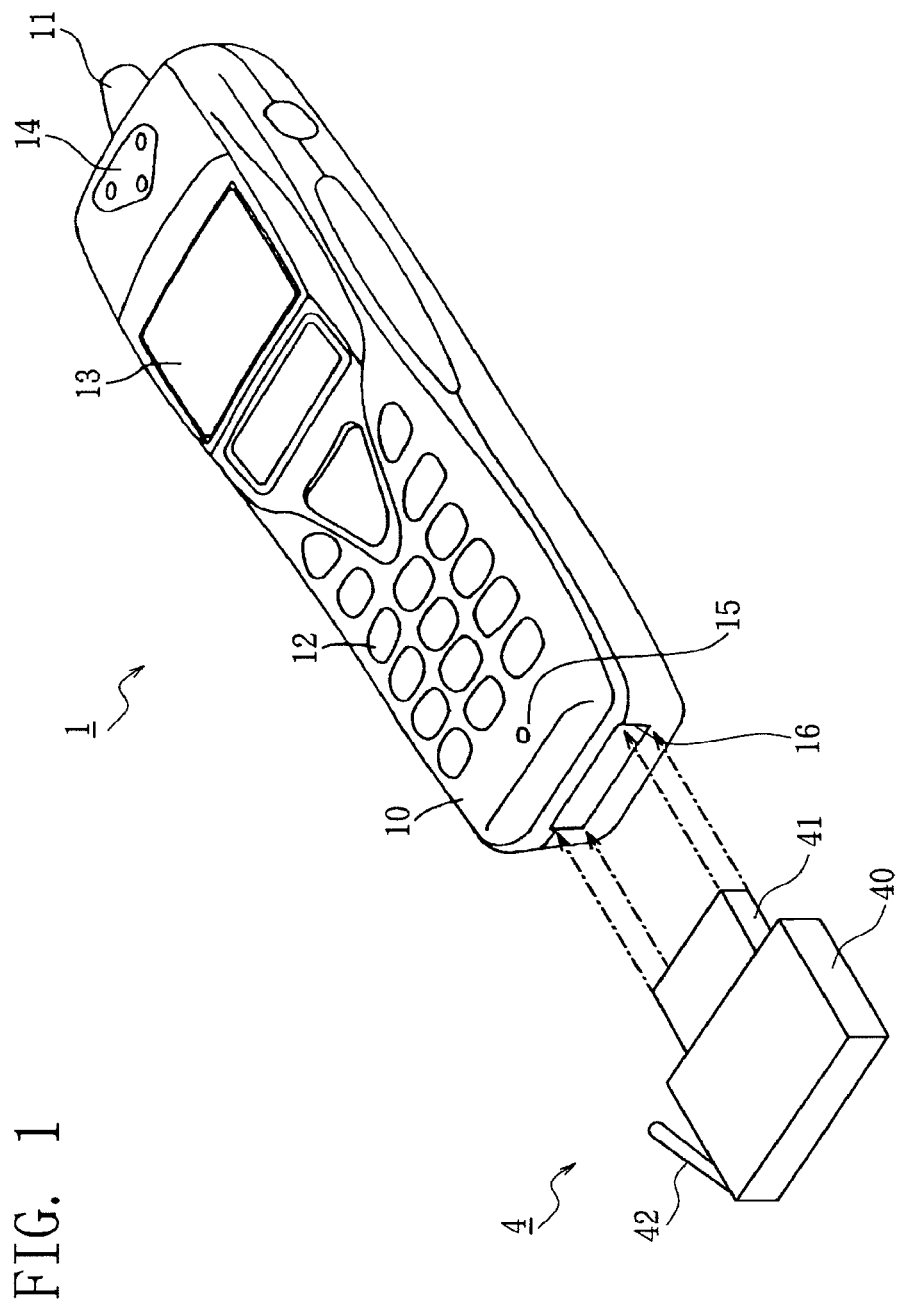
FIG. 1 is an exploded perspective view showing a telephone main body of a first embodiment having a broadcast receiver unit removed therefrom.

A portable telephone with a broadcast receiving function of the present embodiment includes, as shown in FIG. 1, a telephone main body 1 that demonstrates a function as a portable telephone, and a broadcast receiver unit 4 capable of receiving a television broadcast wave and removably attached to the telephone main body 1.

The telephone main body 1 has a flat casing 10. A telephone communications antenna 11 protrudes on a head of the casing 10. The casing 10 has a surface provided with a key input device 12 including a plurality of manipulation keys and a display 13, and having a receiver 14 incorporating a speaker and a transmitter 15 incorporating a microphone arranged on an upper end and a lower end thereof, respectively. Moreover, an opening 16 in which a connector of the broadcast receiver unit 4 is to be inserted is formed on a bottom of the casing 10.

On the other hand, the broadcast receiver unit 4 has a box casing 40. A connector 41 and a broadcast wave receiving antenna 42 protrude on the casing 40.

Figure 2:
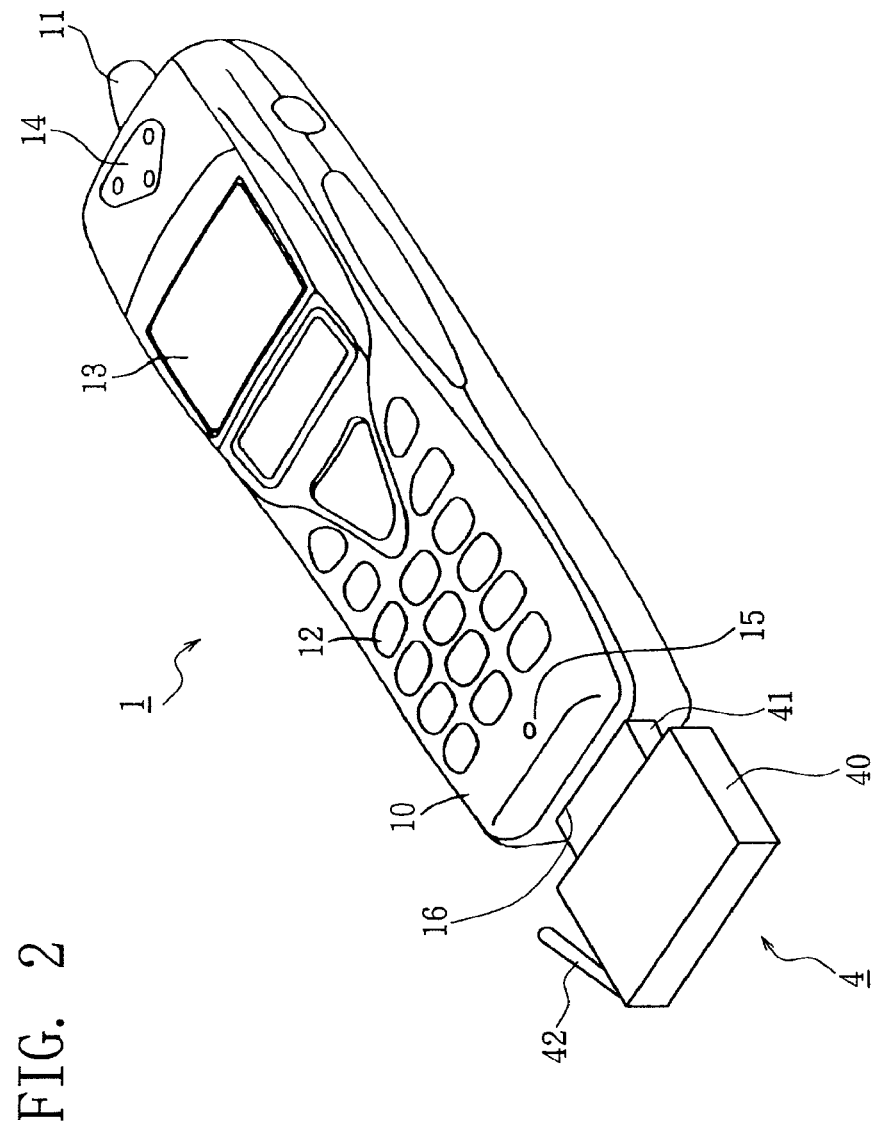
FIG. 2 is a perspective view showing the telephone main body having the broadcast receiver unit attached thereto.

When the broadcast receiver unit 4 is attached to the telephone main body 1, the connector 41 of the broadcast receiver unit 4 is inserted in the opening 16 of the telephone main body 1 as shown in FIG. 2. When the broadcast receiver unit 4 is removed from the telephone main body 1, the opening 16 of the telephone main body 1 is covered with an interface cover (not shown).

Figure 3:
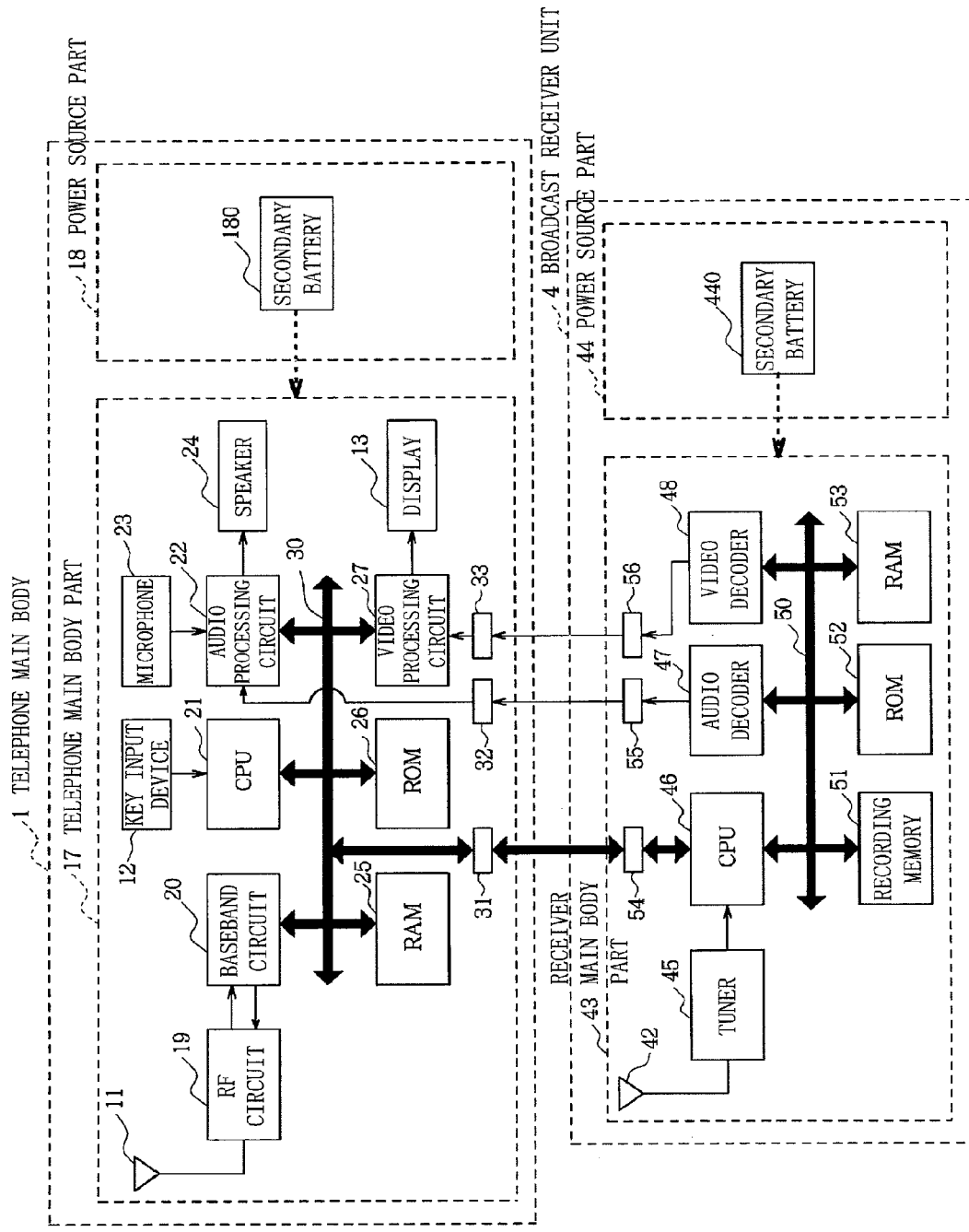
FIG. 3 is a block diagram showing an electric configuration of the telephone main body and the broadcast receiver unit.

FIG. 3 shows an electric configuration of the telephone main body 1 and the broadcast receiver unit 4. The telephone main body 1 includes a telephone main body part 17 and a power source part 18 that serves as a power source of the telephone main body part 17. In the telephone main body part 17, the telephone communications antenna 11, an RF circuit 19 and a baseband circuit 20 are connected in series with each other like the conventional portable telephone. An audio processing circuit 22 and a video processing circuit 27 are connected to the baseband circuit 20 through a bus 30. A microphone 23 and a speaker 24 are connected to the audio processing circuit 22, while the above-mentioned display 13 is connected to the video processing circuit 27. A CPU 21 is connected to the bus 30. The CPU 21 controls operations of the above-mentioned baseband circuit 20, audio processing circuit 22 and video processing circuit 27. The above-mentioned key input device 12 is connected to the CPU 21. Moreover, connected to the bus 30 are a ROM 26 storing a program for performing an operation as a portable telephone, and a RAM 25 for storing various pieces of information such as telephone numbers.

On the other hand, the power source part 18 includes a secondary battery 180. Power obtained from the secondary battery 180 is supplied to the above-mentioned circuits included in the telephone main body part 17, so that these circuits are supplied with the power to perform predetermined operations described below. Used as the secondary battery 180 is a secondary battery with an output voltage having a comparable magnitude with that of a voltage to be applied to the circuits included in the telephone main body part 17.

Furthermore, in the telephone main body part 17 of the present embodiment, interfaces 31, 32, 33 are connected to the above-mentioned bus 30, audio processing circuit 22 and video processing circuit 27, respectively.

The broadcast receiver unit 4 includes a receiver main body part 43 and a power source part 44 that serves as a power source of the receiver main body part 43. In the receiver main body part 43, the broadcast wave receiving antenna 42, a tuner 45 and a CPU 46 are connected in series with each other. An audio decoder 47 and a video decoder 48 are connected to the CPU 46 through a bus 50. Moreover, connected to the bus 50 are a recording memory 51 for storing audio data and video data, a ROM 52 for storing a program for performing an operation as a broadcast receiver, and a RAM 53 for storing various pieces of information such as timer recording information.

On the other hand, the power source part 44 includes a secondary battery 440. Power obtained from the secondary battery 440 is supplied to the above-mentioned circuits included in the receiver main body part 43, so that these circuits are supplied with the power to perform predetermined operations described below. Used as the secondary battery 440 is a secondary battery with an output voltage having a comparable magnitude with that of a voltage to be applied to the circuits included in the receiver main body part 43.

Furthermore, in the receiver main body part 43 of the present embodiment, interfaces 54, 55, 56 are connected to the above-mentioned CPU 46, audio decoder 47 and video decoder 48, respectively.

When the portable telephone of the present embodiment is used as a telephone, the broadcast receiver unit 4 is removed from the telephone main body 1. A signal received by the telephone communications antenna 11 is fed to the baseband circuit 20 through the RF circuit 19 and demodulated to a digital reception signal. The digital reception signal is fed to the audio processing circuit 22 and subjected to a predetermined signal processing. An analog reception signal thereby obtained is fed to the speaker 24 and radiated as sound. On the other hand, a transmission signal inputted into the microphone 23 is fed to the audio processing circuit 22 and subjected to a predetermined signal processing. A digital transmission signal thereby obtained is fed to the baseband circuit 20 and modulated. The digital transmission signal modulated is transmitted from the telephone communications antenna 11 through the RF circuit 19.

Moreover, the above-described portable telephone has a function of downloading various images from a site on the Internet. A digital video signal demodulated in the baseband circuit 20 is fed to the video processing circuit 27 and subjected to a predetermined signal processing. An analog video signal thereby obtained is fed to the display 13. Consequently, the images downloaded from the site on the Internet can be displayed on the display 13.

In contrast, when the portable telephone of the present embodiment is used as a broadcast receiver, the broadcast receiver unit 4 is attached to the telephone main body 1 as shown in FIG. 2. The interfaces 54, 55, 56 of the broadcast receiver unit 4 can be thereby connected to the interfaces 31, 32, 33 of the telephone main body 1, respectively, as shown in FIG. 3. The interface 54 of the broadcast receiver unit 4 is connected to the interface 31 of the telephone main body 1, and thereby transmission and reception of a control signal are possible between the CPU 21 of the telephone main body 1 and the CPU 46 of the broadcast receiver unit 4.

A television broadcast wave received by the broadcast wave receiving antenna 42 is tuned by the tuner 45. A broadcast signal thereby obtained is fed to the CPU 46 and separated into video data and audio data. The video data separated in the CPU 46 is, after fed to the video decoder 48 and decoded, fed to the video processing circuit 27 through the interface 56 of the broadcast receiver unit 4 and the interface 33 of the telephone main body 1. In the video processing circuit 27, the video data inputted thereinto is subjected to a predetermined signal processing. An analog video signal thereby obtained is fed to the display 13. Consequently, video of a television broadcast program can be projected on the display 13.

On the other hand, the audio data separated in the CPU 46 of the broadcast receiver unit 4 is, after fed to the audio decoder 47 and decoded, fed to the audio processing circuit 22 through the interface 55 of the broadcast receiver unit 4 and the interface 32 of the telephone main body 1. In the audio processing circuit 22, the video data inputted there into is subjected to a predetermined signal processing. An analog audio signal thereby obtained is fed to the speaker 24. Consequently, audio of a television broadcast program can be outputted from the speaker 24.

Figure 15:
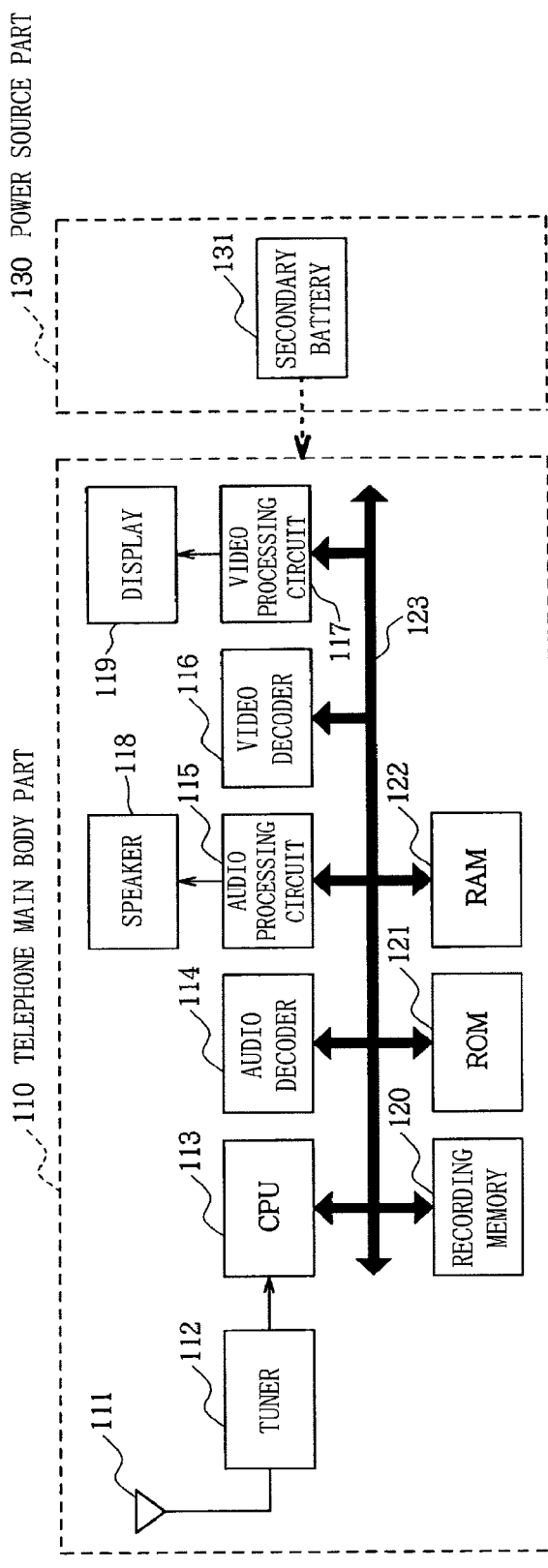
FIG. 15 is a block diagram showing a conventional portable digital broadcast receiver having a recording function.

In the portable telephone with a broadcast receiving function of the present embodiment, because the audio processing circuit 22 and the video processing circuit 27 of the telephone main body 1 are used also as a signal processing circuit for an audio signal included in a television broadcast signal and a signal processing circuit for a video signal included in a television broadcast signal, respectively, the audio processing circuit and the video processing circuit provided in the conventional digital broadcast receiver shown in FIG. 15 may be omitted in the broadcast receiver unit 4. This can realize a telephone that is as a whole small-sized, light-weighted and power-saving.

Moreover, when used as a telephone, the portable telephone can become more small-sized, light-weighted and power-saving by removing the broadcast receiver unit 4 from the telephone main body 1.

Moreover, although a life cycle of a portable telephone has shortened in recent years, according to the portable telephone with a broadcast receiving function of the present embodiment, it is possible to replace only the telephone main body 1 and continue to use the broadcast receiver unit 4.

Furthermore, a secondary battery with an output voltage having a comparable magnitude with that of a voltage to be applied to the circuits included in the telephone main body part 17 is used as the secondary battery 180 of the telephone main body 1, and a secondary battery with an output voltage having a comparable magnitude with that of a voltage to be applied to the circuits included in the receiver main body part 43 is used as the secondary battery 440 of the broadcast receiver unit 4. Therefore, means for raising or dropping an output voltage of the secondary battery is unnecessary in the telephone main body 1 and the broadcast receiver unit 4, so that a telephone can be realized that is as a whole more small-sized, light-weighted and power-saving.

Furthermore, because power obtained from the power source part 18 of the telephone main body 1 and the power source part 44 of the broadcast receiver unit 4 is supplied to the telephone main body part 17 of the telephone main body 1 and the receiver main body part 43 of the broadcast receiver unit 4, respectively, a power supply line is unnecessary between the telephone main body 1 and the broadcast receiver unit 4.

Second Embodiment

Figure 4:
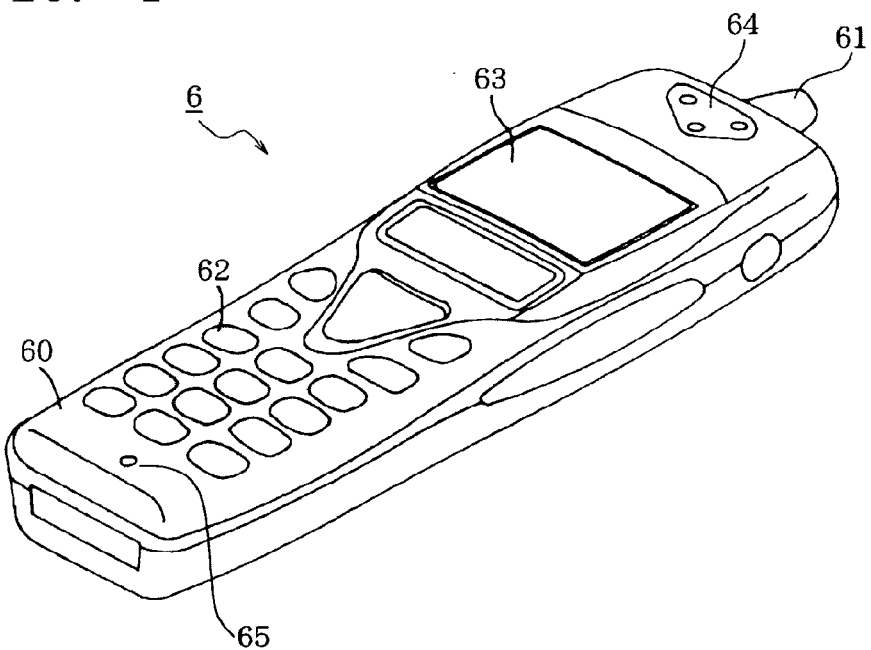
FIG. 4 is a perspective view of a telephone main body of a second embodiment viewed from a front side.
Figure 5:
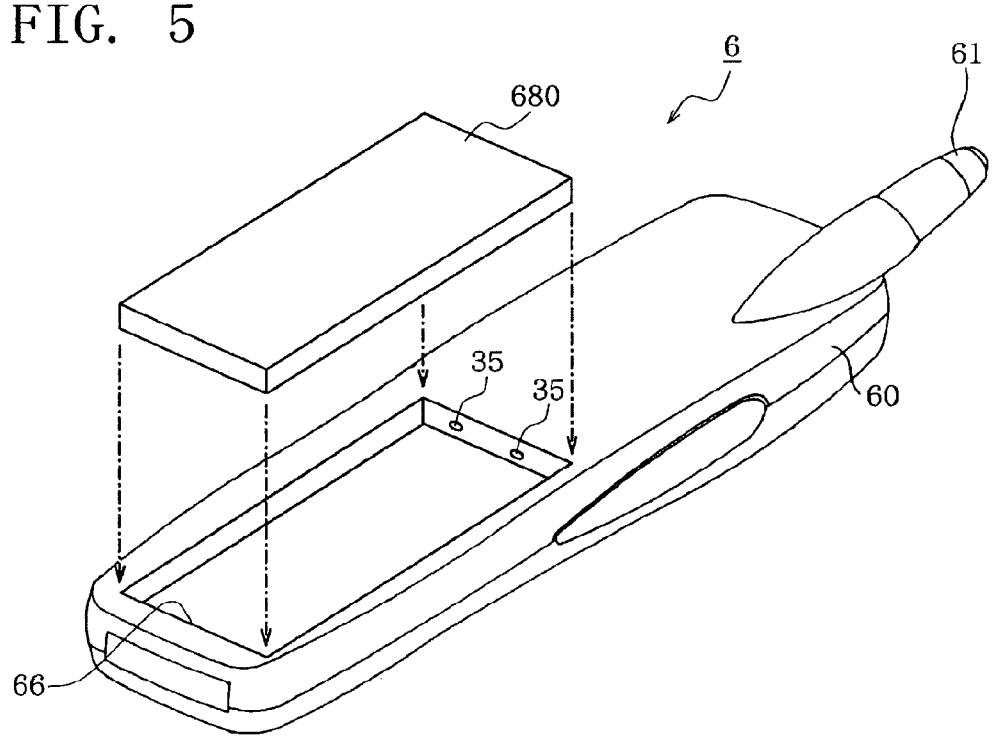
FIG. 5 is an exploded perspective view of the telephone main body viewed from a rear side.
Figure 6:
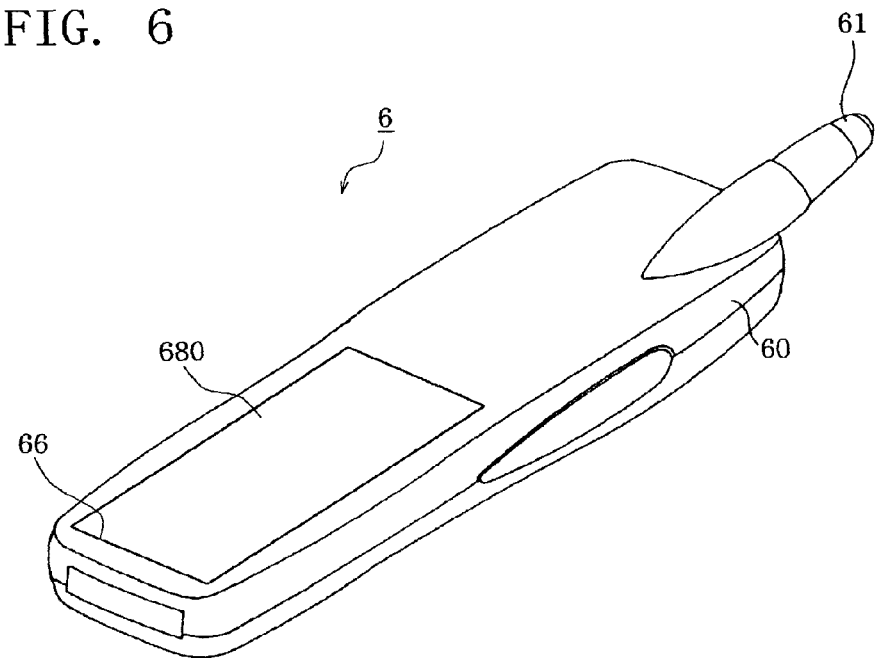
FIG. 6 is a perspective view of the telephone main body viewed from the rear side.
Figure 7:
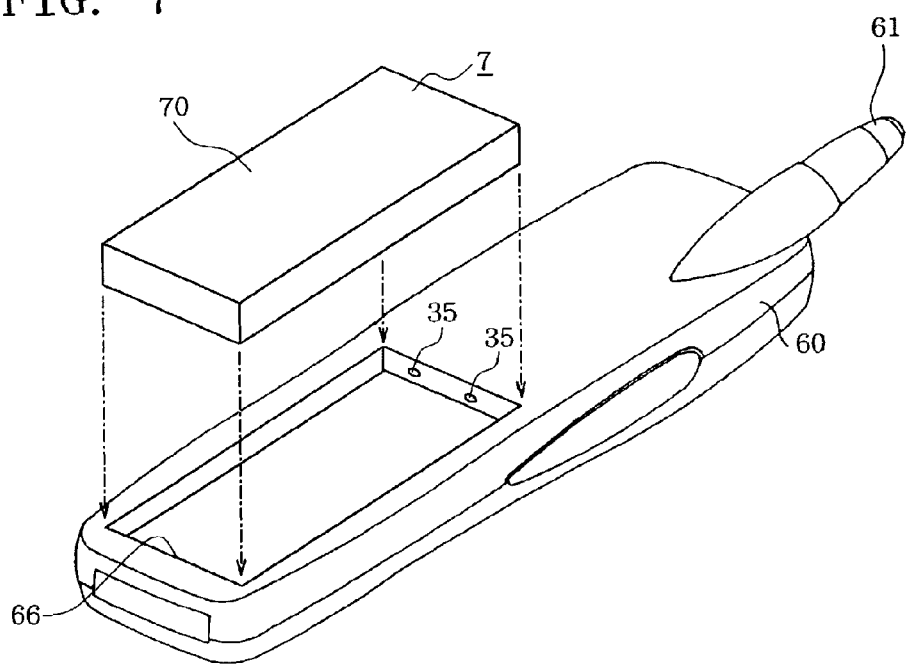
FIG. 7 is an exploded perspective view of the telephone main body having a broadcast receiver unit removed therefrom, viewed from the rear side.
Figure 8:
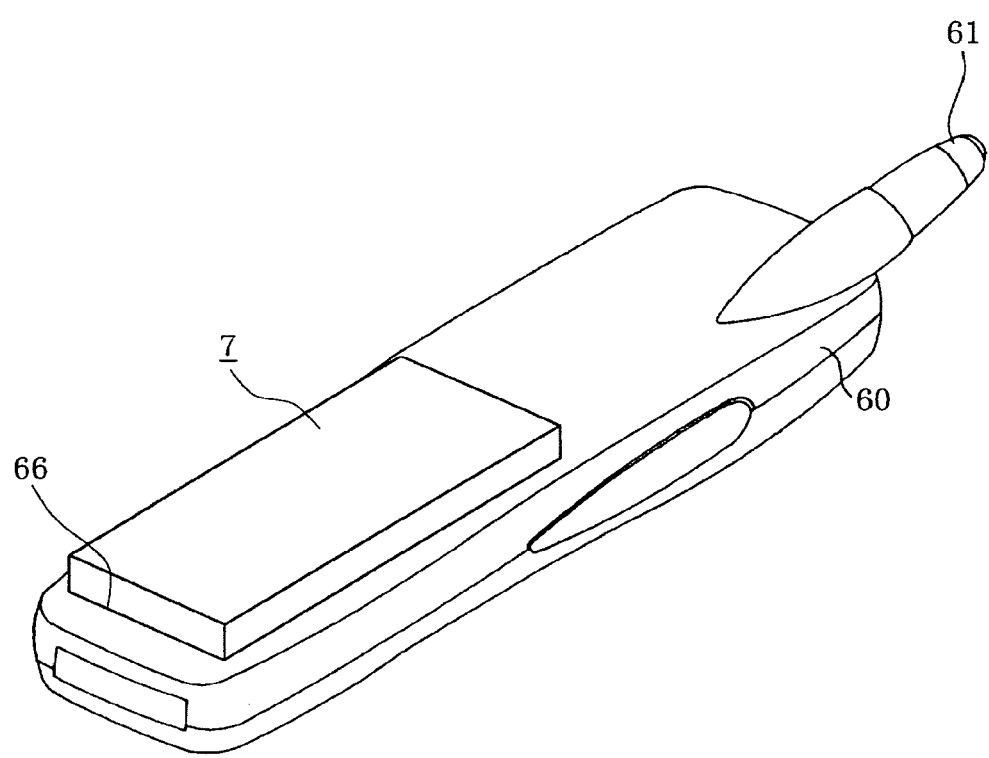
FIG. 8 is a perspective view of the telephone main body having the broadcast receiver unit attached thereto, viewed from the rear side.

A portable telephone with a broadcast receiving function of the present embodiment includes a telephone main body 6 shown in FIG. 4 to FIG. 6 that demonstrates a function as a portable telephone, and a broadcast receiver unit 7 capable of receiving a television broadcast wave and removably attached to the telephone main body 6 as shown in FIG. 7 and FIG. 8.

The telephone main body 6 has a flat casing 60 as shown in FIG. 4. A telephone communications antenna 61 protrudes on a head of the casing 60. The casing 60 has a surface provided with a key input device 62 including a plurality of manipulation keys and a display 63, and having a receiver 64 incorporating a speaker and a transmitter 65 incorporating a microphone arranged on an upper end and a lower end thereof, respectively.

Moreover, the casing 60 has recessed therein a containing portion 66 for a battery pack 680 that serves as a power source of the telephone main body 6 as shown in FIG. 5. A pair of input terminals 35, 35 for inputting power protrude inside the containing portion 66. At the time of use as a portable telephone, the battery pack 680 is contained in the containing portion 66 as shown in FIG. 6, and in this state, the pair of power input terminals 35, 35 and a pair of output terminals of the battery pack 680 contact with each other.

On the other hand, the broadcast receiver unit 7 has a box casing 70 as shown in FIG. 7. The casing 70 has protruded thereon a pair of output terminals for outputting power obtained from a secondary battery (not shown) incorporated therein. At the time of use as a broadcast receiver, the above-mentioned battery pack 680 is removed from the containing portion 66 of the telephone main body 6, and the casing 70 of the broadcast receiver unit 7 is contained in the containing portion 66 as shown in FIG. 8. In this state, the pair of input terminals 35, 35 of the telephone main body 6 and the pair of output terminals of the broadcast receiver unit 7 contact with each other.

Figure 9:
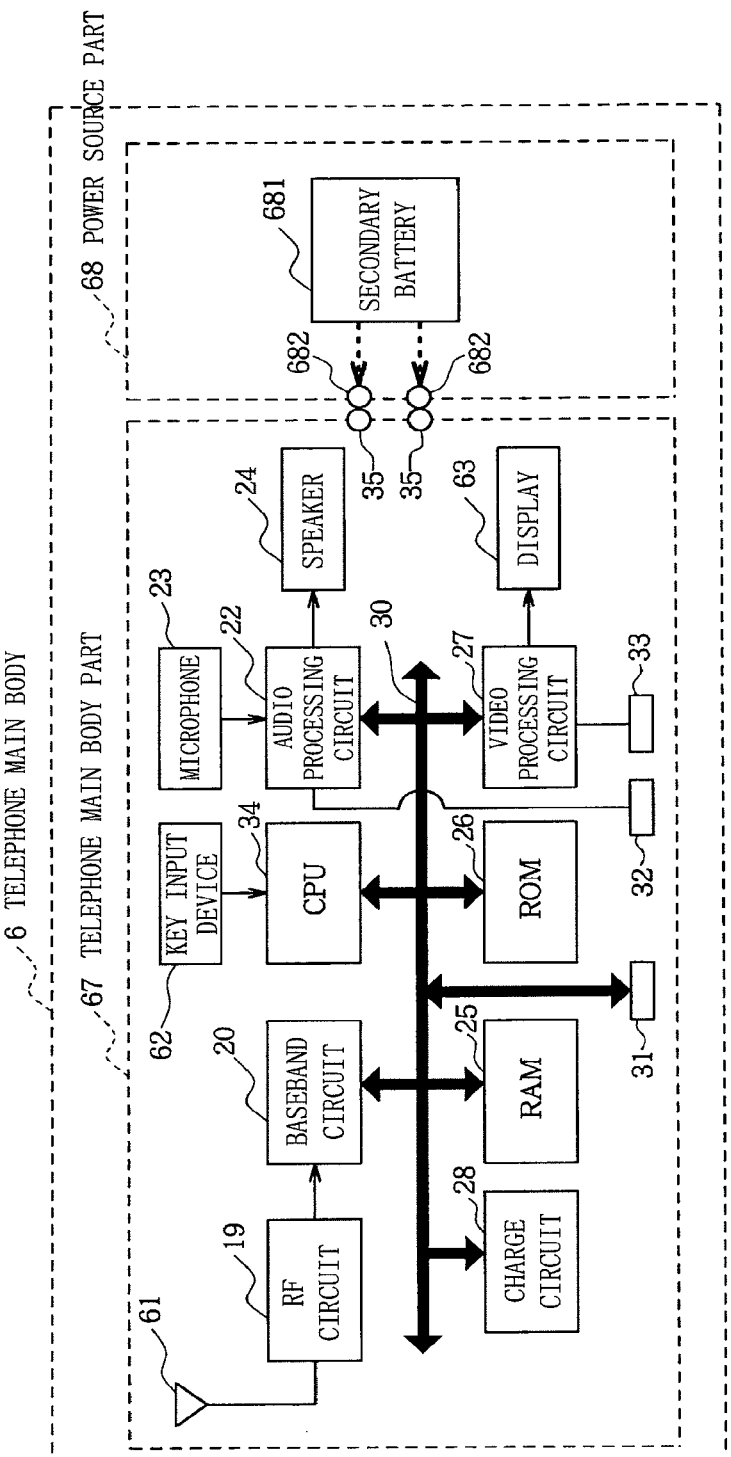
FIG. 9 is a block diagram showing an electric configuration of the telephone main body.

FIG. 9 shows an electric configuration of the telephone main body 6. The telephone main body 6 includes a telephone main body part 67 and a power source part 68 including the above-mentioned battery pack. In the telephone main body part 67, the telephone communications antenna 61, an RF circuit 19 and a baseband circuit 20 are connected in series with each other. An audio processing circuit 22 and a video processing circuit 27 are connected to the baseband circuit 20 through a bus 30. A microphone 23 and a speaker 24 are connected to the audio processing circuit 22, while the above-mentioned display 63 is connected to the video processing circuit 27. A CPU 34 is connected to the bus 30. The CPU 34 controls operations of the above-mentioned baseband circuit 20, audio processing circuit 22 and video processing circuit 27. The above-mentioned key input device 62 is connected to the CPU 34. Moreover, connected to the bus 30 are a ROM 26 for storing a program for performing an operation as a portable telephone, and a RAM 25 for storing various pieces of information such as telephone numbers. Moreover, interfaces 31, 32, 33 are connected to the above-mentioned bus 30, audio processing circuit 22 and video processing circuit 27, respectively.

Furthermore, the telephone main body part 67 of the present embodiment includes a charge circuit 28. An operation of the charge circuit 28 is controlled by the CPU 34.

The pair of input terminals 35, 35 protruding on the casing 60 of the telephone main body 6 as shown in FIG. 5 are connected to the above-mentioned circuits included in the telephone main body part 67 of the present embodiment through a power supply line, which is not shown. The circuits included in the telephone main body part 67 are supplied with power inputted into these input terminals 35, 35 to perform predetermined operations.

On the other hand, the power source part 68 includes a secondary battery 681 and a pair of output terminals 682, 682 for outputting power obtained from the secondary battery 681.

Figure 10:
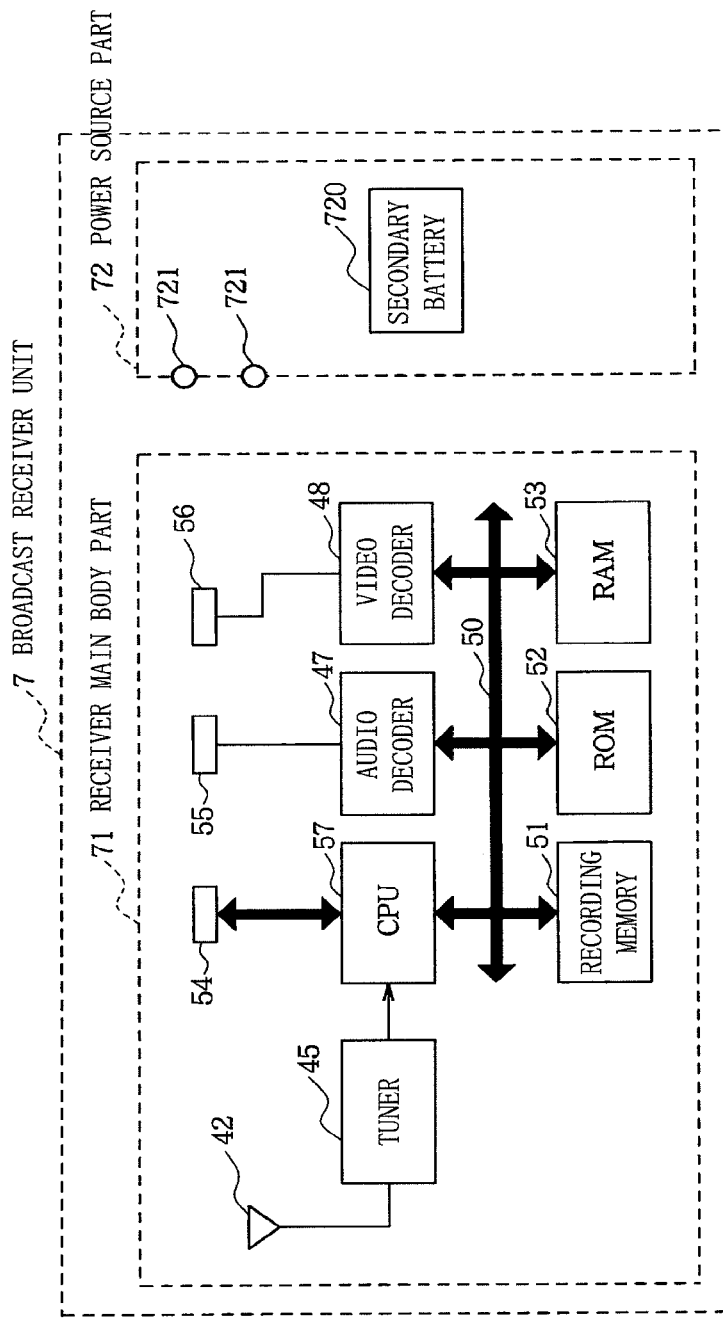
FIG. 10 is a block diagram showing an electric configuration of the broadcast receiver unit.

FIG. 10 shows an electric configuration of the broadcast receiver unit 7. The broadcast receiver unit 7 includes a receiver main body part 71 and a power source part 72 that serves as a power source of the receiver main body part 71 and the telephone main body part 67 of the above-described telephone main body 6. In the receiver main body part 71, a broadcast wave receiving antenna 42, a tuner 45 and a CPU 57 are connected in series with each other. An audio decoder 47 and a video decoder 48 are connected to the CPU 57 through a bus 50. Moreover, connected to the bus 50 are a recording memory 51 for storing audio data and video data, a ROM 52 for storing a program for performing an operation as a broadcast receiver, and RAM 53 for storing various pieces of information such as timer recording information. Moreover, interfaces 54, 55, 56 are connected to the CPU 57, the audio decoder 47 and the video decoder 48, respectively.

On the other hand, the power source part 72 includes a secondary battery 720 and a pair of output terminals 721, 721 protruding on the casing of the broadcast receiver unit 7 as described above.

When the portable telephone of the present embodiment is used as a telephone, the battery pack 680 is contained in the containing portion 66 of the telephone main body 6 as shown in FIG. 6. In this state, the pair of power input terminals 35, 35 of the telephone main body part 67 and the pair of power output terminals 682, 682 of the power source part 68 contact with each other as shown in FIG. 9, so that power obtained from the secondary battery 681 of the power source part 68 is supplied to the circuits included in the telephone main body part 67 through the pair of power output terminals 682, 682 and the pair of power input terminals 35, 35. These circuits are supplied with the power to perform predetermined operations. The operations of the circuits included in the telephone main body part 67 are same as in the first embodiment, and therefore a description thereof is not given.

Figure 11:
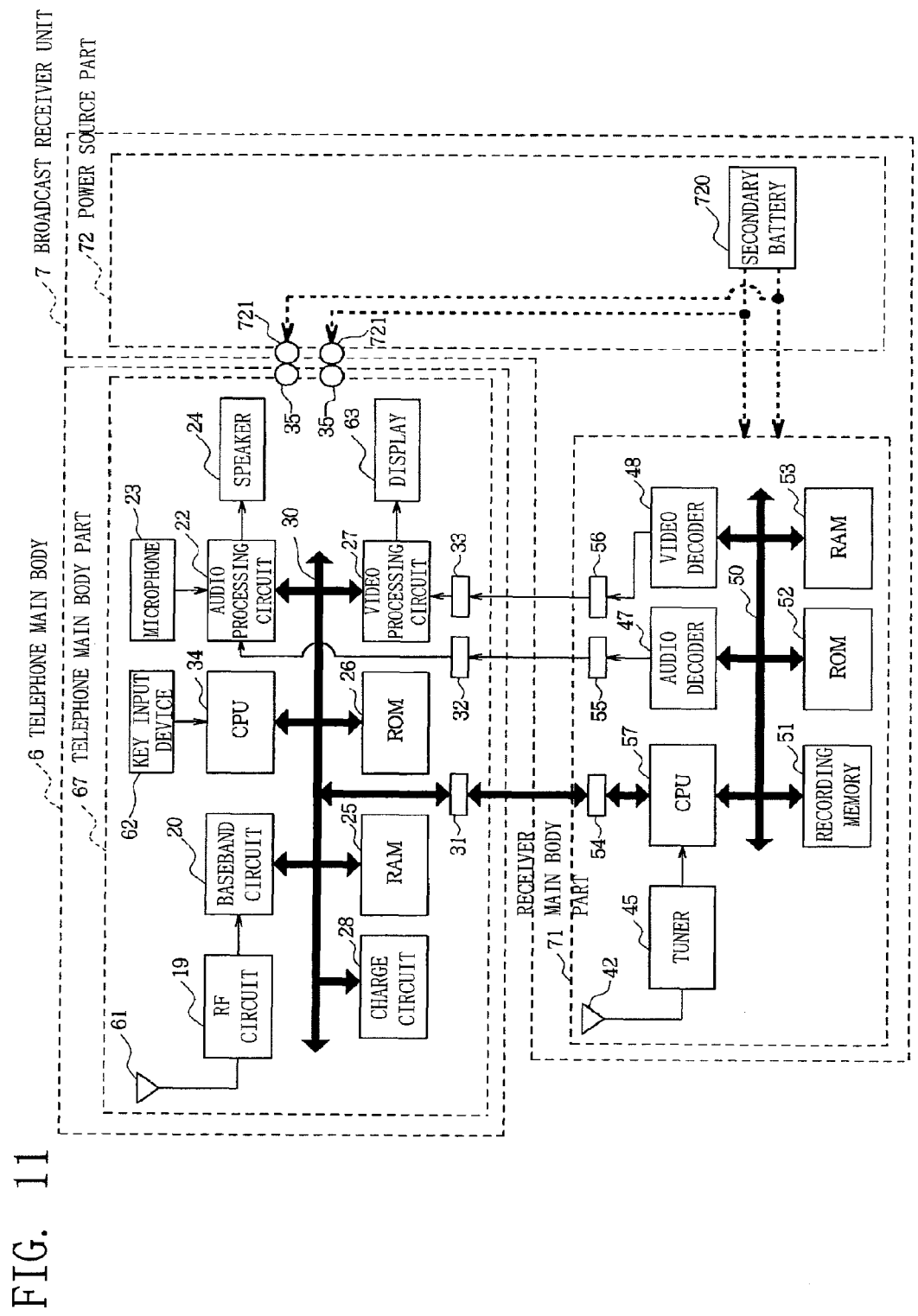
FIG. 11 is a block diagram showing the telephone main body and the broadcast receiver unit attached thereto.

In contrast, when the portable telephone of the present embodiment is used as a broadcast receiver, the broadcast receiver unit 7 is contained in the containing portion 66 of the telephone main body 6 as shown in FIG. 8. In this state, the pair of input terminals 35, 35 of the telephone main body 6 and the pair of output terminals 721, 721 of the broadcast receiver unit 7 contact with each other as shown in FIG. 11, so that power obtained from the secondary battery 720 of the broadcast receiver unit 7 is supplied to the circuits included in the telephone main body part 67 of the telephone main body 6 through the pair of output terminals 721, 721 and the pair of input terminals 35, 35. These circuits are supplied with the power to perform the predetermined operations.

Moreover, the power obtained from the secondary battery 720 is supplied to the circuits included in the receiver main body part 71 of the broadcast receiver unit 7. These circuits are supplied with the power to perform predetermined operations. The operations of the circuits included in the receiver main body part 71 are same as in the first embodiment, and therefore a description thereof is not given.

Moreover, when the telephone main body 6 is placed in a charger (not shown) connected to a commercial power source with the battery pack 680 contained in the containing portion 66 of the telephone main body 6 as shown in FIG. 6, power obtained from the commercial power source is supplied to the secondary battery 681 of the telephone main body 6 by operation of the charge circuit 28 shown in FIG. 9 to charge the secondary battery 681.

On the other hand, when the telephone main body 6 is placed in the charger with the broadcast receiver unit 7 contained in the containing portion 66 of the telephone main body 6 as shown in FIG. 8, power obtained from the commercial power source is supplied to the secondary battery 720 of the broadcast receiver unit 7 by operation of the charge circuit 28 shown in FIG. 11 to charge the secondary battery 720.

In the portable telephone with a broadcast receiving function of the present embodiment, a power supply line for supplying power from the secondary battery 681 of the telephone main body 6 shown in FIG. 9 to the circuits included in the telephone main body part 67 is used also as a power supply line for supplying power from the secondary battery 720 of the broadcast receiver unit 7 shown in FIG. 11 to the circuits included in the telephone main body part 67 of the telephone main body 6. Therefore, it is unnecessary to independently provide the power supply line, so that wiring of the power supply line is simplified in the telephone main body part 67 of the telephone main body 6.

Moreover, because the secondary battery 720 of the broadcast receiver unit 7 shown in FIG. 11 is used as a power supply source at the time of use as a broadcast receiver, which needs great power, the secondary battery 681 of the telephone main body 6 shown in FIG. 9 used as a power supply source at the time of use as a portable telephone may have a smaller capacity. This realizes a more small-sized and light-weighted telephone main body 6.

Furthermore, as described above, because the charge circuit 28 of the telephone main body 6 is used also as a charge circuit for charging the secondary battery 720 of the broadcast receiver unit 7, a charge circuit is unnecessary in the broadcast receiver unit 7, so that a telephone is realized that is as a whole more small-sized, light-weighted and power-saving.

The present invention is not limited to the above-described embodiments in configuration, but can be variously modified within a technical scope of the claims.

For example, in the first embodiment and the second embodiment, the present invention is carried out to a portable telephone, but can also be carried out to a digital camera having a photography function for a still picture and/or a motion picture. Moreover, the present invention can be carried out to other various audio/video playback apparatuses with a speaker and a display.

Figure 12:
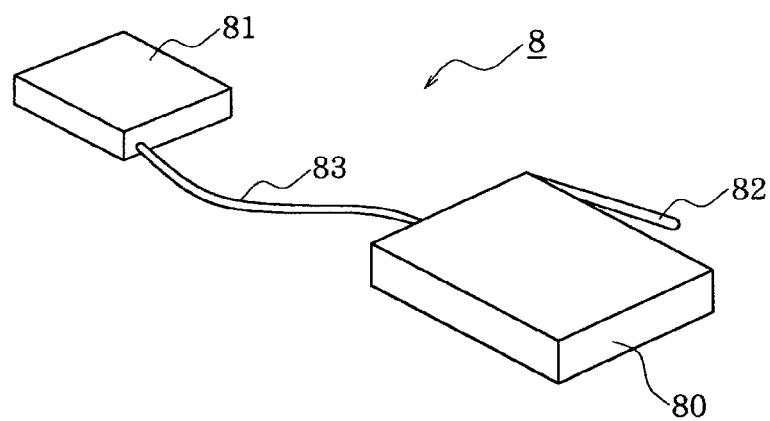
FIG. 12 is a perspective view showing an appearance of a broadcast receiver unit of another embodiment.
Figure 13:
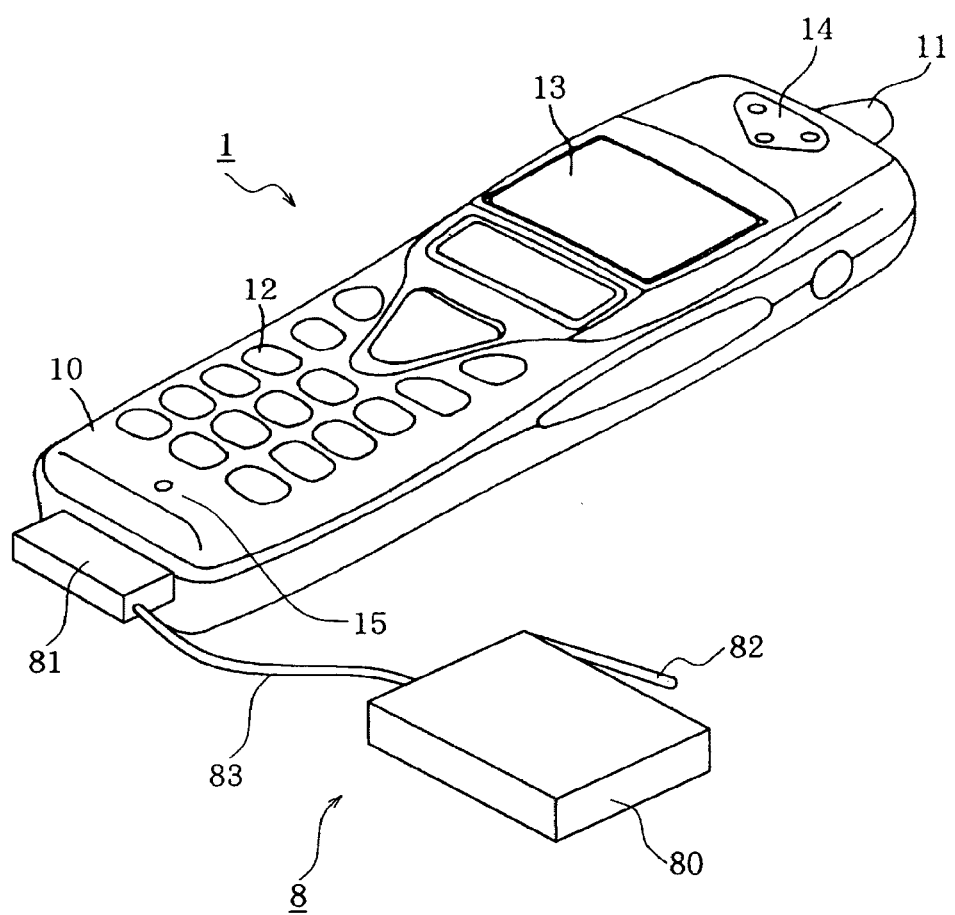
FIG. 13 is a perspective view showing a telephone main body having the broadcast receiver unit attached thereto.
Figure 14:
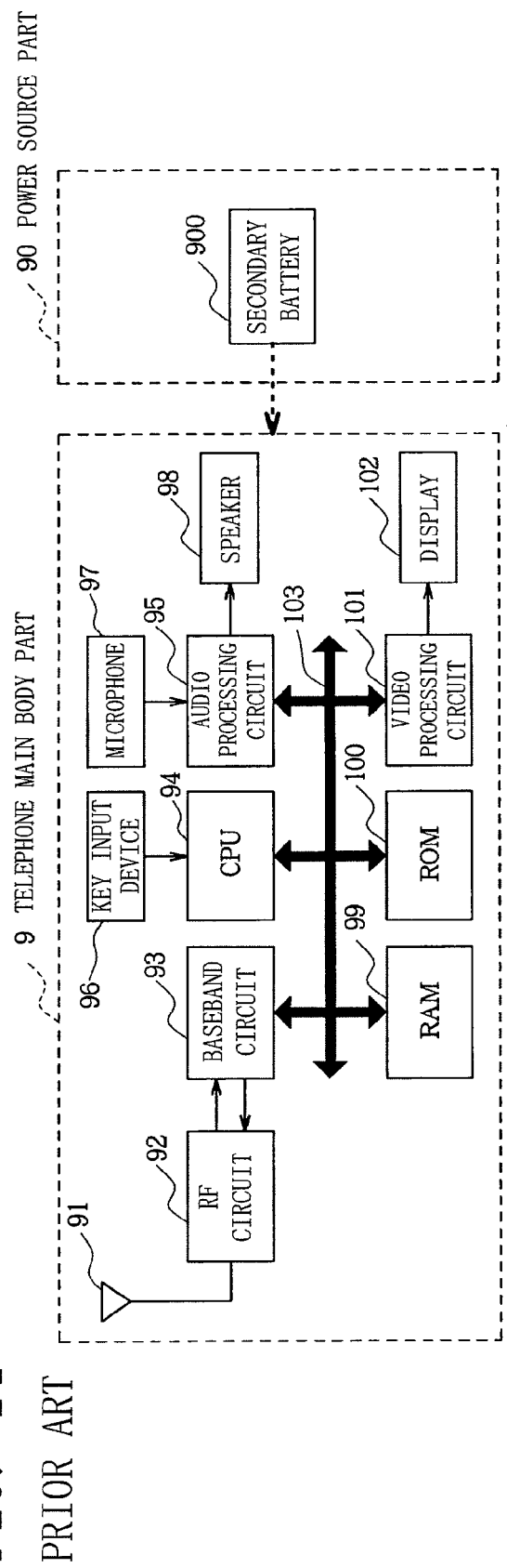
FIG. 14 is a block diagram showing an electric configuration of a conventional portable telephone.

Moreover, in place of the broadcast receiver unit 4 of the first embodiment shown in FIG. 1, a broadcast receiver unit 8 can be used in which a casing 80 having an antenna 82 protruded thereon and a connector 81 are connected to each other with a cable 83 as shown in FIG. 12 and FIG. 13.

Furthermore, in the first embodiment and the second embodiment, each antenna is provided in the telephone main body and the broadcast receiver unit, but it is also possible to provide an antenna only in the telephone main body and use the antenna also as a broadcast wave receiving antenna with the broadcast receiver unit attached to the telephone main body.

Furthermore, it is also possible to use the broadcast wave receiving antenna of the broadcast receiver unit also as a telephone communications antenna with the broadcast receiver unit attached to the telephone main body.

What is claimed is:

1. An audio/video playback apparatus comprising:
a portable electronic device and an audio/video receiver unit removably attached to the portable electronic device; the portable electronic device comprising:
a speaker;
a display;
a first interface module for removably connecting thereto the audio/video receiver unit;
an audio signal processing module connected to the first interface module for processing an audio signal fed thereto from the audio/video receiver unit via the first interface module for output to the speaker; and
a video signal processing module connected to the first interface module for processing a video signal fed thereto from the audio/video receiver unit via the first interface module for output to the display,
the audio/video receiver unit comprising:
a second interface module removably connected to the first interface module of the portable electronic device; and
a signal feeding module for feeding an audio signal and a video signal included in a received signal to the second interface module.

2. The audio/video playback apparatus according to claim 1, wherein the portable electronic device comprises a power source module for serving as a power source of the speaker, the display, the audio signal processing module and the video signal processing module, while the audio/video receiver unit comprises a power source module for serving as a power source of the signal feeding module.

3. The audio/video playback apparatus according to claim 1, wherein the audio/video receiver unit receives a signal downloaded from the Internet.

4. The audio/video playback apparatus according to claim 1, wherein the audio/video receiver unit receives a broadcast signal.

5. The audio/video playback apparatus according to claim 1,
wherein the portable electronic device comprises the first interface module for removably and directly connecting thereto the audio/video receiver unit, and
wherein the audio/video receiver unit comprises the second interface module removably and directly connected to the first interface module of the portable electronic device.

6. The audio/video playback apparatus according to claim 1, wherein the portable electronic device comprises a control module operable to control the audio/video receiver unit.

7. An audio/video receiver unit removably attachable to a portable electronic device with a speaker and a display capable of reproducing and outputting an audio signal and a video signal, comprising:
a first interface module removably connectable to a second interface module of the portable electronic device; and
a signal feeding module for feeding an audio signal and a video signal included in a received signal to the first interface module.

8. The audio/video receiver unit according to claim 7, wherein the audio/video receiver unit is removably and directly attachable to the portable electronic device.

9. The audio/video receiver unit according to claim 7, wherein the audio/video receiver unit receives a control signal from the portable electronic device.

10. An audio/video playback method operated in an audio/video playback apparatus comprising a portable electronic device with a speaker and a display, and an audio/video receiver unit removably attached to the portable electronic device, wherein the method comprises
removably connecting the audio/video receiver unit to the portable electronic device,
feeding an audio signal and a video signal included in a received signal by the audio/video receiver unit to the portable electronic device,
processing the audio signal in the portable electronic device to prepare a first signal to be outputted to the speaker and feeding the first signal to the speaker,
processing the video signal in the portable electronic device to prepare a second signal to be outputted to the display and feeding the second signal to the display, and
outputting the first signal to the speaker and outputting the second signal to the display.

11. The audio/video playback method according to claim 10, wherein the audio/video receiver unit receives a signal downloaded from the Internet.

12. The audio/video playback method according to claim 10, wherein the audio/video receiver unit receives a broadcast signal.

13. The audio/video playback method according to claim 10,
wherein the portable electronic device comprises the first interface module for removably and directly connecting thereto the audio/video receiver unit, and
wherein the audio/video receiver unit comprises the second interface module removably and directly connected to the first interface module of the portable electronic device.

14. The audio/video playback method according to claim 10, wherein the portable electronic device comprises a control module operable to control the audio/video receiver unit.

15. A portable electronic device comprising:
a speaker;
a display;
an interface module for removably connecting thereto an audio/video receiver unit;
an audio signal processing module connected to the interface module for processing an audio signal fed thereto from the audio/video receiver unit via the interface module for output to the speaker; and
a video signal processing module connected to the interface module for processing a video signal fed thereto from the audio/video receiver unit via the interface module for output to the display.

16. The portable electronic device according to claim 15, wherein the audio/video receiver unit receives a signal downloaded from the Internet.

17. The portable electronic device according to claim 15, wherein the audio/video receiver unit receives a broadcast signal.

18. The portable electronic device according to claim 15, wherein the portable electronic device comprises the first interface module for removably and directly connecting thereto the audio/video receiver unit.

19. The portable electronic device according to claim 15, wherein the portable electronic device comprises a control module operable to control the audio/video receiver unit.

* * * * *